March 3, 1959 — B. S. PATRICK — 2,875,829
APPARATUS FOR STAMPING SURFACES
Filed Dec. 1, 1954 — 4 Sheets-Sheet 1

INVENTOR.
BRUNO S. PATRICK
BY Robert R. Finch
Attorney

March 3, 1959  B. S. PATRICK  2,875,829
APPARATUS FOR STAMPING SURFACES

Filed Dec. 1, 1954  4 Sheets-Sheet 2

INVENTOR.
BRUNO S. PATRICK
BY Robert R. Finch
attorney

March 3, 1959     B. S. PATRICK     2,875,829
APPARATUS FOR STAMPING SURFACES

Filed Dec. 1, 1954     4 Sheets-Sheet 3

INVENTOR.
BRUNO S. PATRICK
BY Robert R. Sirch
attorney

March 3, 1959 — B. S. PATRICK — 2,875,829
APPARATUS FOR STAMPING SURFACES
Filed Dec. 1, 1954 — 4 Sheets-Sheet 4

INVENTOR.
BRUNO S. PATRICK
BY Robert R. Finch
Attorney

United States Patent Office 2,875,829
Patented Mar. 3, 1959

2,875,829

APPARATUS FOR STAMPING SURFACES

Bruno S. Patrick, Mount Vernon, N. Y.

Application December 1, 1954, Serial No. 472,410

1 Claim. (Cl. 164—108)

This invention relates generally to the stamping of solid surfaces for cutting or embossing them. More particularly it relates to such operations where the final stamping has at least one cut edge portion that is divergent or non-parallel to at least a portion of the remainder of the cut edge of the stamping.

By cut edge is meant the edge between the outside diameter of the stock (top of the cut) and the inside diameter of the stock (bottom of the cut).

Stampings are of two general types: The first is that where the cut is made with a single stamping punch and the edges of the resulting cut are all substantially parallel. The second type, and the one with which this invention concerns itself, is that type where the stock is of substantial thickness and at least one portion of the final cut edge is divergent or non-parallel to at least a portion of the remainder of the cut edge.

It is therefore the primary object of this invention to provide ways and means for making stampings in surfaces in which at least one cut edge of the stamping is divergent to the remaining cut edge portion.

A specific object is to provide ways and means for making such stampings whereby a single mandrel is utilized for the entire operation.

And a still further object is to provide ways and means for completing the entire stamping on a single machine in a single operation.

The various features of novelty and thereby the metes and bounds, as well as the equivalents thereof, of the invention are pointed out with particularity in the appended claims, but for a clear and complete understanding of the invention and of its objects and advantages, reference is had to the accompanying, illustrative but not limiting, drawings and description thereof which explain in detail the invention as applied in a particular modification for the forming of slotted bayonet sleeves.

Figure 1:
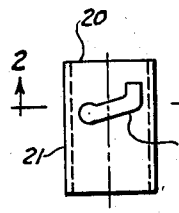
Figure 1 is a side view of the bayonet sleeve to be formed.
Figure 2:
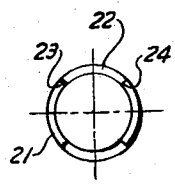
Figure 2 is a plan view taken along the lines 2—2 of Figure 1.

In Figures 1 and 2 there is shown a bayonet sleeve 20 which comprises a cylindrical section 21 having an irregular slot 22 in its side wall. The end edges 23 and 24 of the slot are normal to the side walls of the cylinder 21 and thus are divergent with respect to each other.

Figure 3:
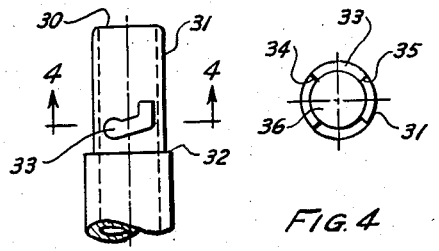
Figure 3 is a side view of the mandrel used for forming the bayonet sleeve shown in Figures 1 and 2.
Figure 4:
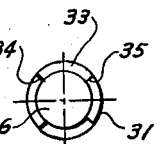
Figure 4 is a plan view taken along lines 4—4 of Figure 3.

Figures 3 and 4 show the basic mandrel used in forming the bayonet sleeve of Figures 1 and 2 in accordance with this invention. The mandrel 30 comprises a cylindrical section 31 having a stock retaining shoulder 32 and adapted to receive on its outer surface the cylindrical stock 21 used to form the bayonet sleeve. The mandrel is equipped with an opening or slot 33 in its side corresponding to the entire slot to be formed in the bayonet sleeve. Such slot being transverse at an acute angle to the longitudinal axis of the mandrel and bayonet sleeve. The end edges 34 and 35 of the mandrel opening are normal to the side wall of the mandrel. The mandrel has a hollow core 36 for receiving material displaced from the stock through the mandrel opening.

Figure 5:
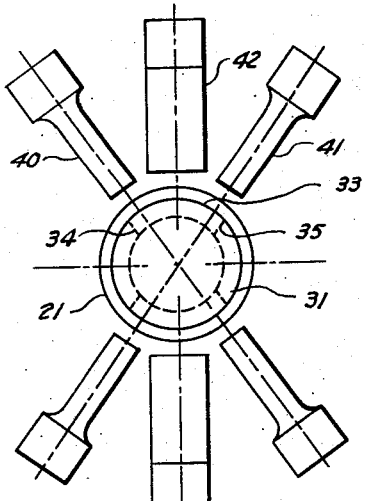
Figures 5, 6, 7 and 8 show the sequence of steps for obtaining the desired stamping on the stock.

In Figure 5 the cylindrical stock 21 is in place on the mandrel 31. The mandrel has a cutting opening 33 having normal cutting edges 34 and 35. The end portion cutting tools 40 and 41 and the center portion cutter 42 are shown in position preparatory to cutting. Cutting tools 40 and 41 are shaped to conform to the end portions of the mandrel opening and have their sides parallel to the end edges of the mandrel opening. The center cutter is shaped to conform to the portion of the mandrel opening that will remain after end cutters have finished their cut.

Figure 6:
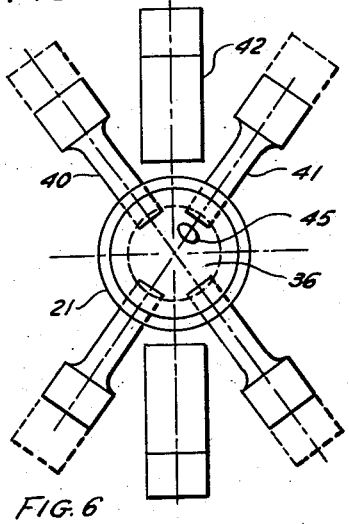

Figure 6 shows the first step in the cutting operation in which the end cutters 40 and 41 are simultaneously driven through the cylindrical 21 being cut into the end portions of the mandrel opening. This operation cuts to the desired shape the opposite ends of the bayonet slot. Scrap material 45 is forced into the hollow mandrel core 36 from whence it is discharged to scrap. The center cutter 42 remains inactive during this step.

Figure 7:
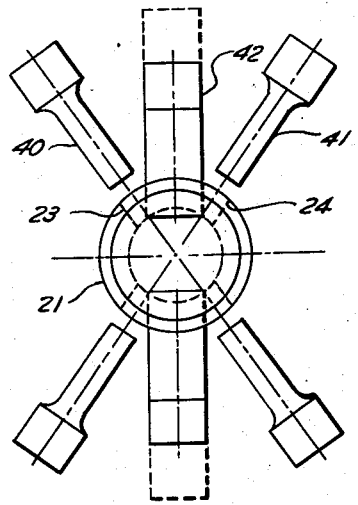
Figure 8:
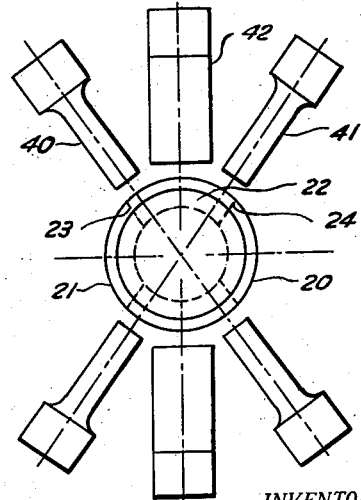

In Figure 7 the end cutters 40 and 41 have been withdrawn while the center cutter 42 has been forced through the stock into the mandrel opening. This finishes the cut and, as shown in Figure 8, the product of the cut is a bayonet sleeve 20 having a slot 22 with end edges 23 and 24 that are at right angles to the side walls of the stock.

As shown, the center cutter is so dimensioned that it overlaps the area cut by the end cutters. This insures a complete and clean cut.

The angle which the slot edges form with the cylinder walls need not be a right angle, but may be any angle desired consistent with the limitations imposed by the material, size and shape of the cut. Similarly, the divergent edge need not be an end edge as shown, but may be the top or center edge. Obviously the nature and strength of the materials being cut as well as the size and angle of the cut will influence the operation.

While Figures 5, 6, 7, and 8 shows an operation in which there are two end cuts followed by a center cut, the invention is equally useful in cases where only two cuts are required. In such a case the cuts are successive.

In all cases the limitation must be observed that the cut is not so large as to preclude acceptance of displaced material by the mandrel core.

Figure 9:
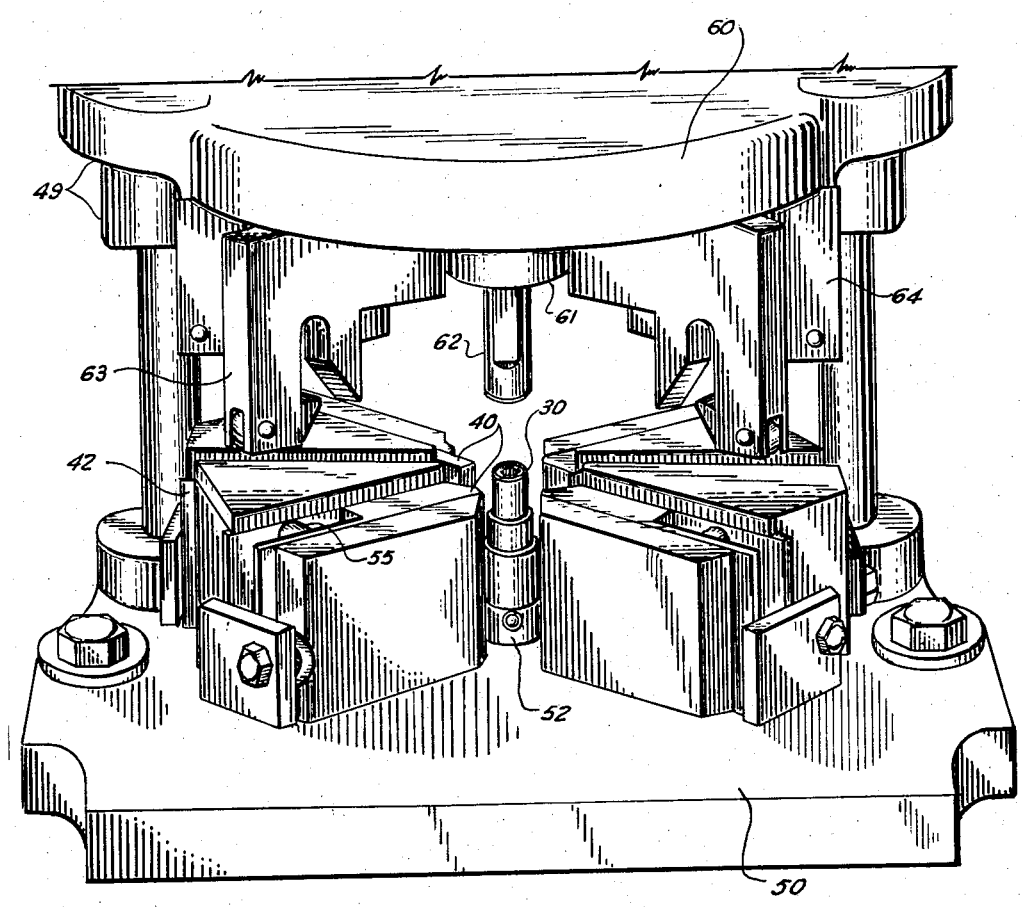
Figure 9 is a view of a modification embodying the invention and performing the entire operation in a single operation.

In Figure 9 is shown a machine adapted to utilize the invention for the production of bayonet sleeves similar to those shown in Figures 1 and 2.

In Figure 9, the entire assembly 49 comprises a fixed bottom section 50 and a vertically movable top section 60 adapted to be lowered onto the bottom section.

The fixed bottom section comprises a center piece 52 adapted to hold the mandrel 30 in place and the mandrel is in turn adapted to accept the stock to be stamped or cut. Spaced radially around the center piece are the cutter blocks 40 and 42 with attached cutters 41 and 43. The cutter blocks are held in proper relationship by spacers 53 which guide the movement of the cutter blocks.

The movable top section 60 comprises a center piece 61 with a stock holder 62 adapted to engage the center piece 52 of the bottom section to secure the stock in place during cutting. Cams 63 and 64 are provided for engaging the driving pieces 55 of the cutter blocks 40 and 42 of the bottom section to drive them radially inwardly toward the center piece and then to retract them.

Displaced stock material falls or is blown downwardly out of the mandrel core to waste. Finished bayonet pieces are ejected by ejector 56 which is actuated by a cam 57 mounted on the top section.

Figure 10:
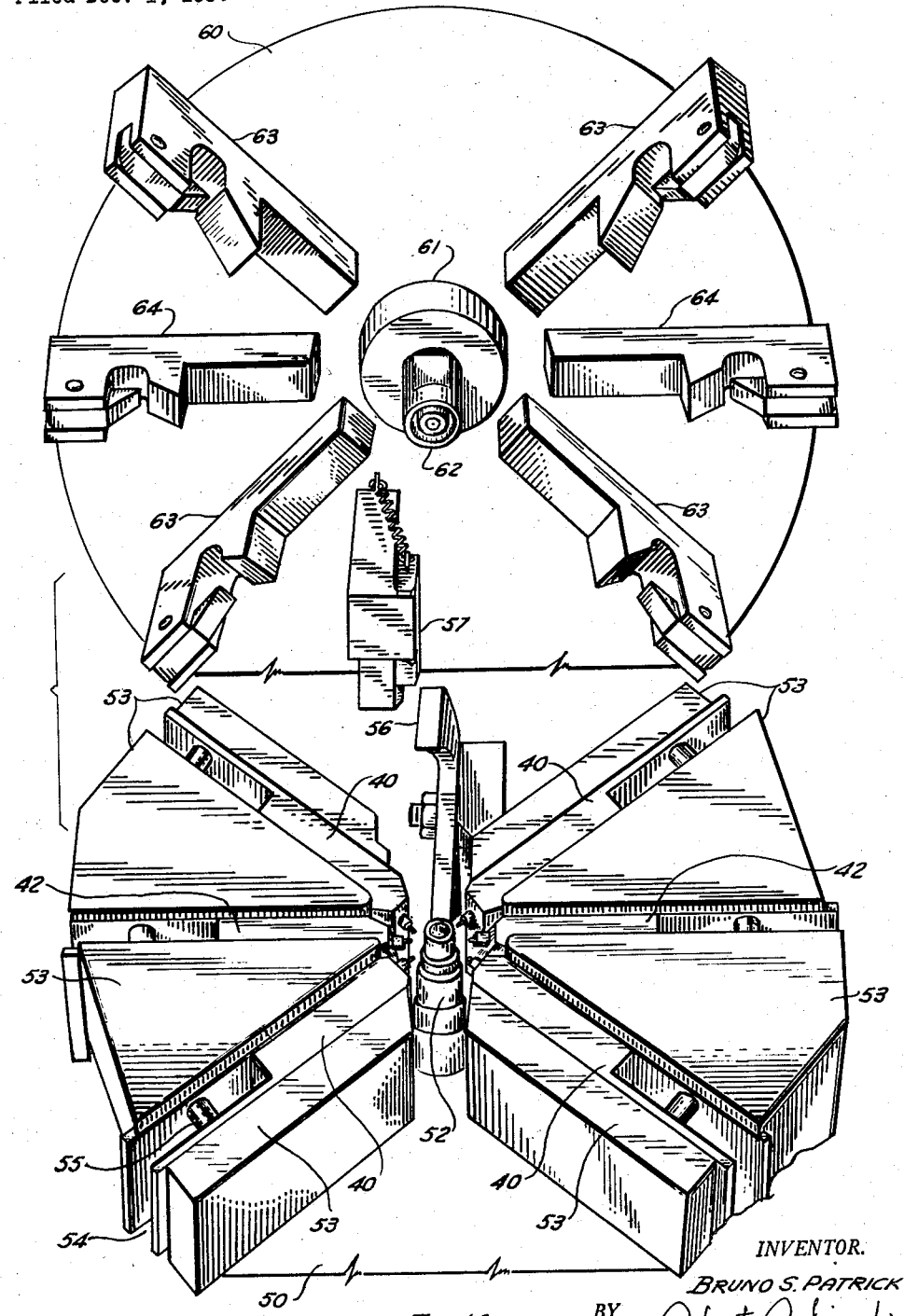
Figure 10 is a view of the top and bottom section of Figure 9 with the pieces exploded and turned for clarity.

In Figure 10 the bottom section 50 and the top section 60 are rolled apart for a better view of their parts. In the bottom section, the center piece 52 holds the mandrel 30 in place. Spacing blocks 53 are so located that the cutter blocks 40 and 42 are spaced radially around the center piece. Each of the cutter blocks has a hollow portion 54 in which is mounted a driving piece 55 for engaging the cams to move the block radially inwardly and outwardly.

The bottom section is also equipped with an ejector 56 that is actuated by a cam 57 mounted on the top piece 60.

The top section 60 has a center base piece 61 on which is mounted a stock holder 62 for holding stock to be cut in place on the mandrel 30.

The top section is equipped with cams 63 and 64 for actuating the corresponding cutter blocks 40 and 42 of the bottom section.

Figure 11:
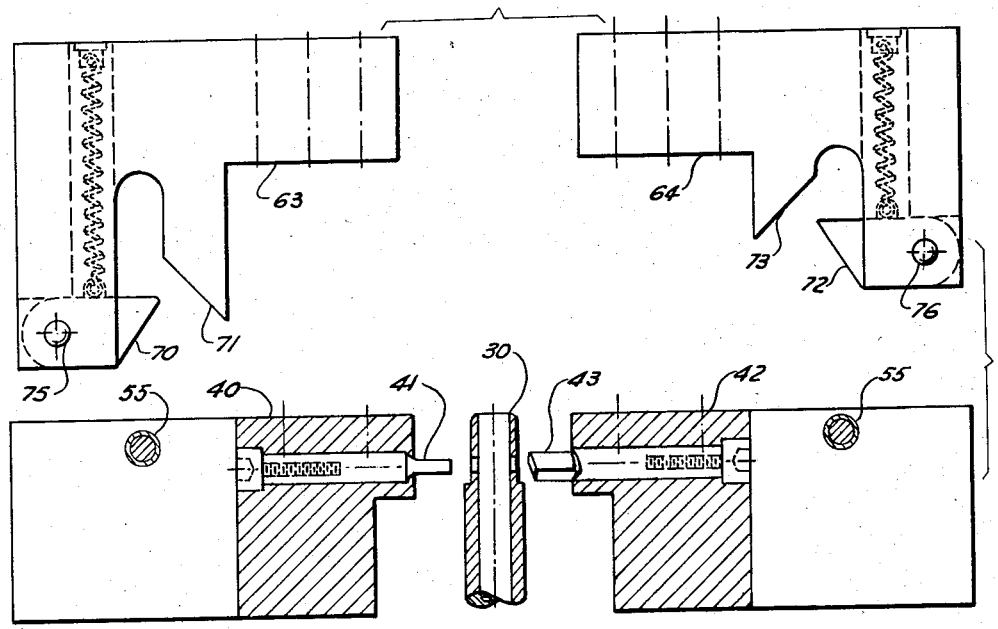
Figures 11 and 12 show details of the cam action and cutter travel of the assembly of Figures 9 and 10.
Figure 12:
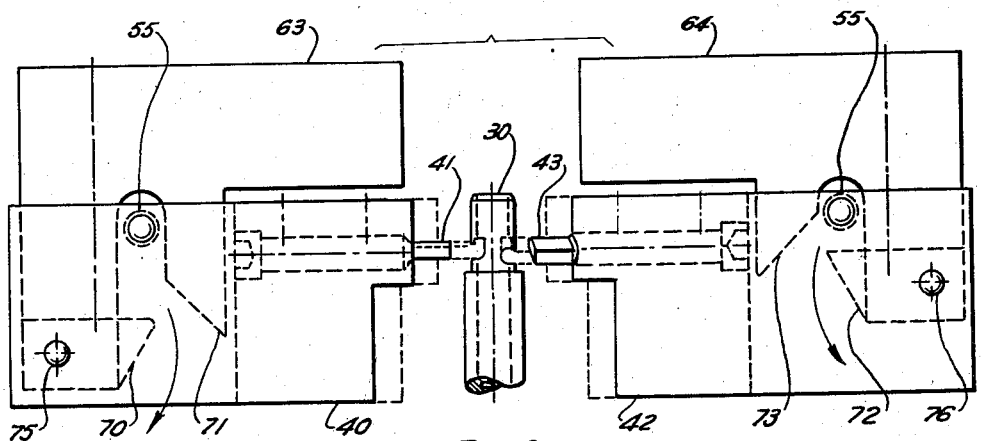

Figures 11 and 12 show the relative movement of the cutter blocks 40 and 42 when engaged by cam mechanisms 63 and 64. For purposes of illustration, the cutter blocks 40 and 42 are shown as positioned on directly opposite sides of the center piece, however, their true relationship is shown in the preceding drawings.

In Figure 11, the parts are shown in the open or inactive position. The mandrel 30 is in the center and the cutting blocks 40 and 42 with their attached cutters or punches 41 and 43 are spaced radially around the center. Actuating cams 63 and 64 are located on the top section directly above the cutter blocks. The cams each have a thrust cam 70 and 72 as well as a return cam 71 and 73 all of which are adapted to engage the driving pieces 55 of the cutter blocks on the bottom section.

The actuating cams are so arranged that one cutter block 40 is driven into and retracted from the mandrel opening before the other cutter block 42 is driven inwardly toward the mandrel opening. The thrust or inward driving cams 70 and 72 are pivoted, as at 75 and 76, to permit their displacement during the upward movement of the top section after the cutting operation is completed.

Figure 12 shows the cams and cutter blocks after the stamping operation is completed. The movement of the cutter blocks is shown by the dotted lines.

The end cutter 41 and the center cutter 43 are normally side-by-side and both directed toward the mandrel so that the edges of the cuts made by the two cutters are not all parallel to each other. The end cutter 41 must complete its cycle before the adjacent cutter 43 enters the mandrel opening. This latter is accomplished by the cam action which actuates the cutters in a definite sequence so that all cutters enter some portion of the mandrel opening and the desired divergent edge cut is made by a series of partial overlapping cuts on a single mandrel.

The cams shown in the drawings attain the desired sequence during a single downward movement of the top section. The first cam, being mounted on a longer base, engages and disengages before the second cam can engage.

In making the bayonet sleeve 20 of Figure 1, the ends of the slot are cut simultaneously while the center portion is cut after the cycle of the end cutters is completed.

Referring now to Figures 9 to 12:

In operation, stock to be stamped is placed on the bottom center piece 52. The top section 60 is then lowered and the stock holder 62 contacts the stock, holding it firmly in place. As the top section continues down, the thrust cam 70 engages the driving pieces 55 of the end cutter blocks 40 thus driving the cutters 41 into and through the stock. As the section is further lowered the driving piece 55 is engaged by a return cam 71 and retracted from the stock. Continued downward movement of the section then causes the second thrust cam 72 to engage the driving piece 55 of the center cutting block thus driving it into the stock and, finally, return cam 73 retracts the center cutter block and the cut is completed. Upon completion of the cut the top section is raised, the spring loaded cams 70 and 72 being displaced to pass over the driving pieces 55. Upward motion of the top section also actuated the ejector which removes the finished piece.

In actual production, this invention was utilized for the production of bayonet sleeves. One worker, using this invention on only one machine, produced 9,000 sleeves in a single eight hour period. Using the old method required three workers and three machines to produce only 3,000 sleeves in an eight hour period.

I claim:

Apparatus for cutting tubular stock to form in the wall thereof an elongated opening transverse at an acute angle to the longitudinal axis of said stock, said apparatus comprising a base; an elongated tubular mandrel with a hollow interior on said base, said mandrel having in its wall an elongated opening transverse at an acute angle to the longitudinal axis of said mandrel; three radially movable spaced apart cutting dies in radially spaced association with said mandrel, the first of said dies corresponding to one end portion of said elongated opening and adapted to fit thereinto, the second of said dies corresponding to the opposite end portion of said elongated opening and adapted to fit thereinto, and the third of said dies corresponding to the remaining portion of said elongated opening between said opposite end portions and adapted to fit thereinto, all of said dies lying in the same transverse plane with said elongated opening; and means for effecting movement of said dies to cut an elongated opening in stock on said mandrel, said means comprising driving means enabling radial movement of only said first and second dies through said stock and into said opposite end portions of said elongated opening thereby cutting said opposite end portions in said stock by displacing material into the hollow interior of said mandrel, means for retracting said first and second dies from said opening, means enabling radial movement of only said third die through said stock and into the remaining portion of said elongated opening between said ends thereby completing said elongated opening in said stock by displacing additional material into the hollow interior of said mandrel, and means for retracting said third die from said opening.

References Cited in the file of this patent

UNITED STATES PATENTS

| 162,435 | Travis | Apr. 20, 1875 |
| 610,213 | White | Sept. 6, 1898 |
| 1,503,551 | Nice | Aug. 5, 1924 |
| 1,717,612 | McNeil | June 18, 1929 |
| 1,895,589 | Spatta | Jan. 31, 1933 |
| 2,329,020 | Wales | Sept. 7, 1943 |

FOREIGN PATENTS

| 7,471 | Great Britain | May 4, 1889 |
| 369,747 | Great Britain | Mar. 31, 1932 |